(12) United States Patent
Chen

(10) Patent No.: US 11,196,807 B1
(45) Date of Patent: Dec. 7, 2021

(54) DATA TRANSMISSION SYSTEM WITH NETWORK SERVICE DECENTRALIZATION AND METHOD THEREOF

(71) Applicants: Inventec (Pudong) Technology Corporation, Shanghai (CN); INVENTEC CORPORATION, Taipei (TW)

(72) Inventor: Long Chen, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/229,871

(22) Filed: Apr. 14, 2021

(30) Foreign Application Priority Data

Sep. 17, 2020 (CN) .......................... 202010979605.5

(51) Int. Cl.
*G06F 15/173* (2006.01)
*H04L 29/08* (2006.01)
*H04L 12/24* (2006.01)

(52) U.S. Cl.
CPC ...... *H04L 67/1095* (2013.01); *H04L 41/5041* (2013.01); *H04L 67/025* (2013.01); *H04L 67/16* (2013.01)

(58) Field of Classification Search
CPC ............. H04L 67/1095; H04L 41/5041; H04L 67/025; H04L 67/16
See application file for complete search history.

(56) References Cited

U.S. PATENT DOCUMENTS

| 8,521,889 | B2* | 8/2013 | Anschutz | H04L 47/762 709/228 |
| 10,915,578 | B1* | 2/2021 | Hunter | G06N 3/08 |
| 2005/0083858 | A1* | 4/2005 | Loa | H04L 45/08 370/254 |
| 2011/0191460 | A1* | 8/2011 | Sailhan | H04L 41/0893 709/224 |
| 2012/0166583 | A1* | 6/2012 | Koonce | H04L 67/22 709/217 |
| 2019/0014124 | A1* | 1/2019 | Reddy | H04L 63/108 |
| 2020/0323030 | A1* | 10/2020 | Mehta | H04L 63/0807 |
| 2021/0073285 | A1* | 3/2021 | Hunter | G06F 8/35 |
| 2021/0073287 | A1* | 3/2021 | Hunter | H04L 63/126 |

* cited by examiner

*Primary Examiner* — Thanh T Nguyen

(57) ABSTRACT

The present disclosure discloses a data transmission system with network service decentralization and a method thereof. A business service node is connected with a business service lite agent, a consumption service node is connected with a consumption service lite agent, the business service lite agent is connected with the consumption service lite agent, registration and change of service nodes are realized through lite agents, the service nodes realize data transmission of requests and responses through the lite agents, and when the connection to part of the lite agents fails, the data transmission of the requests and the responses can still be realized through other lite agents. Therefore, a technical effect of data transmission with network service decentralization can be achieved.

10 Claims, 5 Drawing Sheets

DATA TRANSMISSION SYSTEM WITH NETWORK SERVICE DECENTRALIZATION AND METHOD THEREOF

CROSS REFERENCE TO RELATED APPLICATION

The present application claims the benefit of priority to Chinese Patent Application No. 2020109796055, entitled "Data Transmission System with Network Service Decentralization and Method thereof", filed with CNIPA on Sep. 17, 2020, the content of which is incorporated herein by reference in its entirety.

FIELD OF THE INVENTION

The present disclosure relates to a data transmission system and a method thereof, in particular, to a data transmission system with network service decentralization and a method thereof through lite agent and service nodes.

BACKGROUND

With the promotion of microservice design methods, communications between services are increasing and are becoming more frequent. How to configure service nodes for services will be a problem that must be considered. To solve the above problems, the traditional technology uses a domain name system (DNS) service, and the service accesses a service node through a function variable name. When the service node changes an Internet protocol address, an administrator needs to change a domain name system parsing configuration in time, and there is a domain name system cache and refresh interval in this process, which possibly causes interruption of the service.

After the architecture of the service node supports clustering, a usual practice is to use an API gateway mode for load balancing and forward a request to a currently available service node. At this time, regardless of whether the API gateway mode is in a highly available deployment, it still belongs to a central node, and the DNS works abnormally and may cause all related services to fail to work normally.

An existing method to solve the above problems is to introduce a service mesh framework, which uses a message array and a shared database to realize registration and discovery of services, and conduct detailed management. However, such a scheme will still introduce central nodes, whether it is a message array or a shared database, if these central nodes are disabled, all service nodes will be in an inoperable state.

To sum up, it can be seen that in the prior art, there has been a long-term problem that existing network services have centralized service nodes, and all the service nodes cannot work when the central nodes are disabled. Therefore, it is necessary to propose improved technical means to solve this problem.

SUMMARY

The present disclosure provides a data transmission system with network service decentralization and a method thereof. The data transmission system with network service decentralization includes: a business service node, a business service lite agent (LA), a consumption service node, and a consumption service LA.

When initiated, the business service node provides management information of the business service node. The business service node receives a network parameter and generates a service response corresponding to the network parameter. The business service node feeds back the service response.

The business service LA is connected with the business service node to receive the management information of the business service node from the business service node. The business service LA performs a registration program on the management information of the business service node to update a service list. The business service LA performs a synchronizing operation on the service list.

The consumption service node transmits a node name and the network parameter of the business service node. The consumption service node receives the feedback service response.

The consumption service LA is connected with the business service LA. The consumption service LA synchronously obtains the service list from the business service LA. The consumption service LA is connected with the consumption service node to receive the node name and the network parameter of the business service node from the consumption service node. The consumption service LA inquires an Internet protocol (IP) address of the corresponding business service node from the service list according to the node name of the business service node. The consumption service LA transmits the network parameter to the corresponding business service node according to the IP address of the business service node. The consumption service LA receives the feedback service response from the business service node. The consumption service LA transmits the feedback service response to the consumption service node.

The data transmission method with network service decentralization disclosed in the present disclosure comprises the following steps: firstly, connecting a business service node to a business service LA; then, connecting a consumption service node to a consumption service LA; then, connecting the business service LA to the consumption service LA; then, when initiated, providing, by the business service node, management information of the business service node to the business service LA; then, performing, by the business service LA, a registration program on the management information of the business service node to update a service list; then, synchronizing, by the business service LA, the service list to the consumption service LA; then, receiving, by the consumption service node, a node name and a network parameter of the business service node; then, transmitting, by the consumption service node, the node name and the network parameter of the business service node to the consumption service LA; then, inquiring, by the consumption service LA, an IP address of the corresponding business service node from the service list according to the node name of the business service node; then, transmitting, by the consumption service LA, the network parameter to the corresponding business service node according to the IP address of the business service node; then, generating, by the business service node, a service response corresponding to the network parameter; then, feeding back, by the business service node, the service response to the consumption service LA; and finally, feeding back, by the consumption service LA, the service response to the consumption service node.

The system and the method disclosed in the present disclosure are described as above, and differ from the prior art in that the business service node is connected with the business service LA, the consumption service node is connected with the consumption service LA, the business service LA is connected with the consumption service LA, registration and change of service nodes are realized through the LAs, the service nodes realize data transmission of requests and responses through the LAs, and when the connection to part of the LAs fails, the data transmission of the requests and the responses can still be realized through other LAs.

By means of the above technical means, the present disclosure can achieve the technical effect of data transmission with network service decentralization.

DESCRIPTIONS OF REFERENCE NUMERALS

Figure 1:
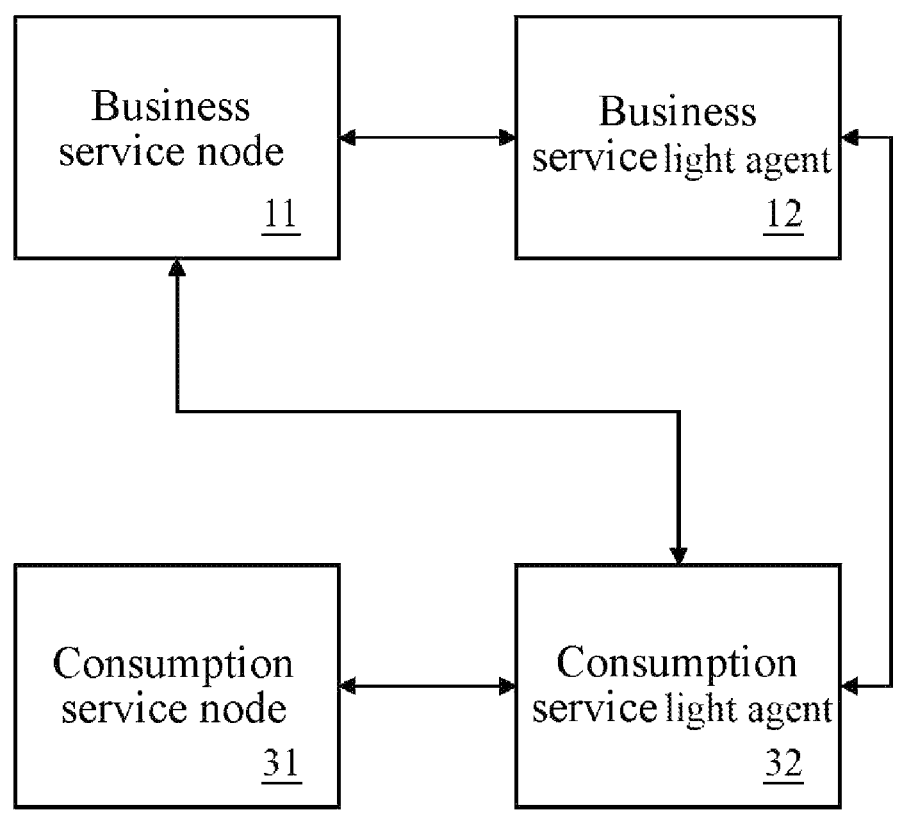
FIG. 1 illustrates a block diagram of a data transmission system with network service decentralization according to the present disclosure.

11 Business service node
12 Business service lite agent
21 Service node
22 Lite agent
31 Consumption service node
32 Consumption service lite agent
51 Management information
52 Service list
53 Node name
54 Network parameter
55 Service response

DESCRIPTION OF THE SPECIFIC EMBODIMENTS

The implementation of the present disclosure will be described in detail with the drawings and embodiments, so as to fully understand and implement an implementation process of how the present disclosure applies technical means to solve technical problems and achieve technical effects.

Figure 2:
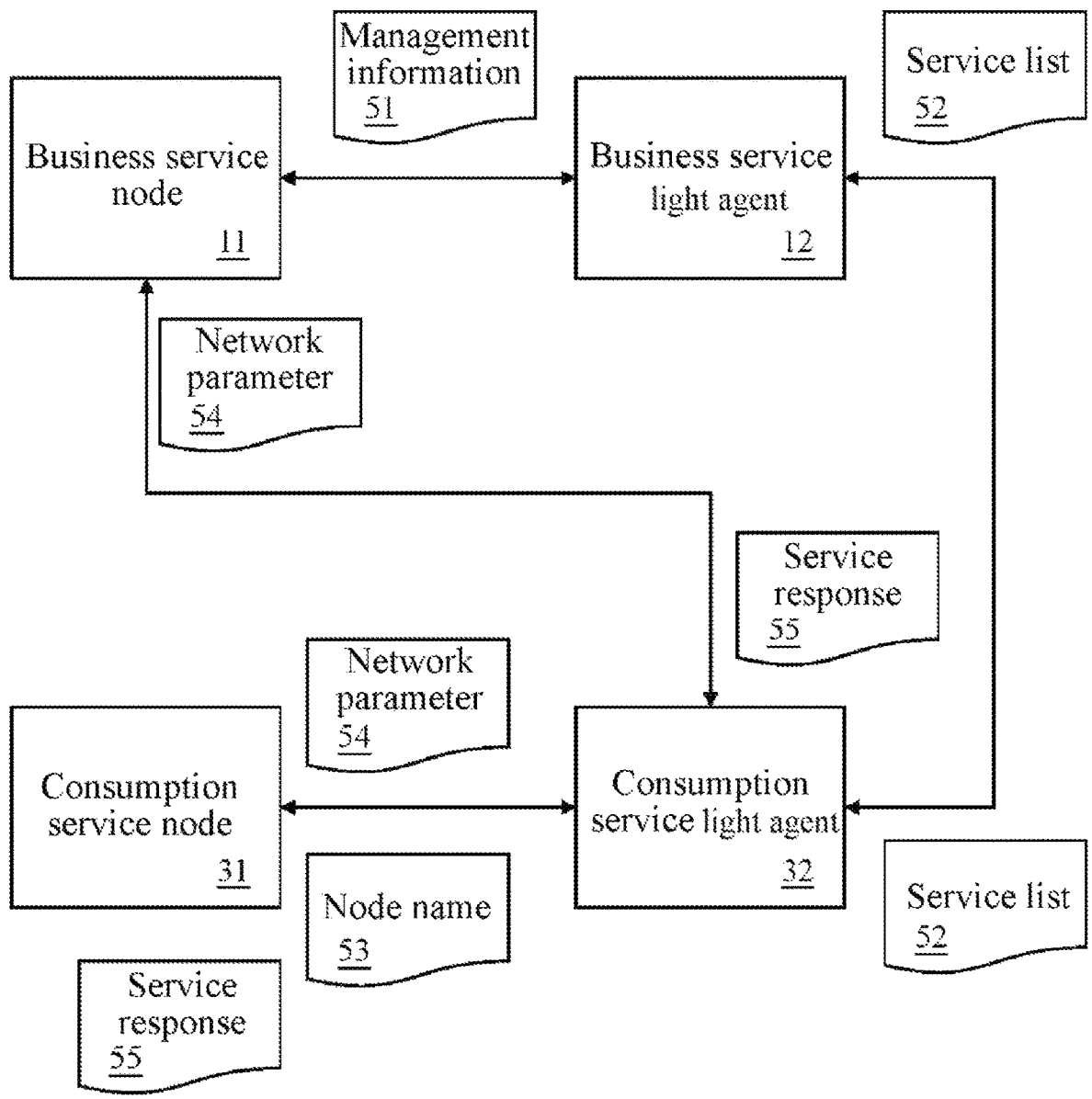
FIG. 2 and FIG. 3 illustrate data flow direction diagrams of data transmission with network service decentralization according to the present disclosure.

A data transmission system with network service decentralization disclosed in the present disclosure will be described below at first. Referring to FIG. 1 and FIG. 2, FIG. 1 illustrates a block diagram of a data transmission system with network service decentralization of the present disclosure, and FIG. 2 illustrates a data flow direction diagram of data transmission with network service decentralization of the present disclosure.

The data transmission system with network service decentralization disclosed in the present disclosure includes: a business service node 11, a business service lite agent (LA) 12, a consumption service node 31, and a consumption service LA 32.

In the description of the present disclosure according to some embodiments, a single business service node 11, a single business service LA 12, a single consumption service node 31, and a single consumption service LA 32 are described. An actual network service architecture may include a plurality of business service nodes 11, a plurality of business service LAs 12, a plurality of consumption service nodes 31, and a plurality of consumption service LAs 32. Each business service LA 12 and each consumption service LA 32 are connected to each other to build a mesh connection architecture.

The business service node 11 is connected with the business service LA 12, the consumption service node 31 is connected with the consumption service LA 32, and the business service LA 12 is connected with the consumption service LA 32.

It is worth noting that the business service LA 12 builds HTTP persistent connection with the consumption service LA 32 through a pre-built connection configuration or a user datagram protocol (UDP).

When initiated, the business service node 11 provides management information 51 of the business service node 11 to the business service LA 12. The management information 51 of the business service node 11 includes a node name, such as ServiceA, of the business service node 11, an Internet protocol address of the business service node 11, the latest access frequency of the business service node 11, a node state of the business service node 11, and a response time of the business service node 11. These are only for illustration, and the application scope of the present disclosure is not limited to this.

The business service LA 12 may receive the management information 51 of the business service node 11 from the business service node 11. Then, the business service LA 12 performs a registration program on the management information 51 of the business service node 11 to update a service list 52.

Then, the business service LA 12 performs a synchronizing operation on the service list 52. That is, the business service LA 12 synchronizes the service list 52 to the consumption service LA 32. When the consumption service node 31 transmits a node name 53 that is "ServiceA" and a network parameter 54 that is "status" of the business service node 11, the consumption service LA 32 may receive the node name 53 that is "ServiceA" and the network parameter 54 that is "status" of the business service node 11 from the consumption service node 31.

The consumption service LA 32 inquires an Internet protocol (IP) address of the corresponding business service node 11 from the service list 52 according to the node name 53 that is "ServiceA" of the business service node 11.

The consumption service LA 32 transmits the network parameter 54 that is "status" to the corresponding business service node 11 according to the IP address of the business service node 11. After the business service node 11 receives the network parameter 54 that is "status" from the consumption service LA 32, the business service node 11 may generate a service response 55 corresponding to the network parameter 54 that is "status".

When the business service node 11 generates the service response 55 corresponding to the network parameter 54 that is "status", the business service node 11 may feed back the service response 55 to the consumption service LA 32, and the consumption service LA 32 may receive the feedback service response 55 from the business service node 11.

When the consumption service LA 32 receives the service response 55 from the business service node 11, the consumption service LA 32 may feed back the service response 55 to the consumption service node 31, and the consumption service node 31 may receive the service response 55 from the consumption service LA 32.

The consumption service LA 32 further records a response duration that the consumption service LA 32 transmits the network parameter 54 that is "status" to the corresponding business service node 11 according to the IP address of the business service node 11 and the business service node 11 feeds back the service response 55 to the consumption service LA 32.

The consumption service LA 32 updates the response duration of the business service node 11 to the response time of the business service node in the service list 52, and performs a synchronizing operation on the updated service list 52. That is, the consumption service LA 32 synchronizes the updated service list 52 to the business service LA 12.

Figure 3:
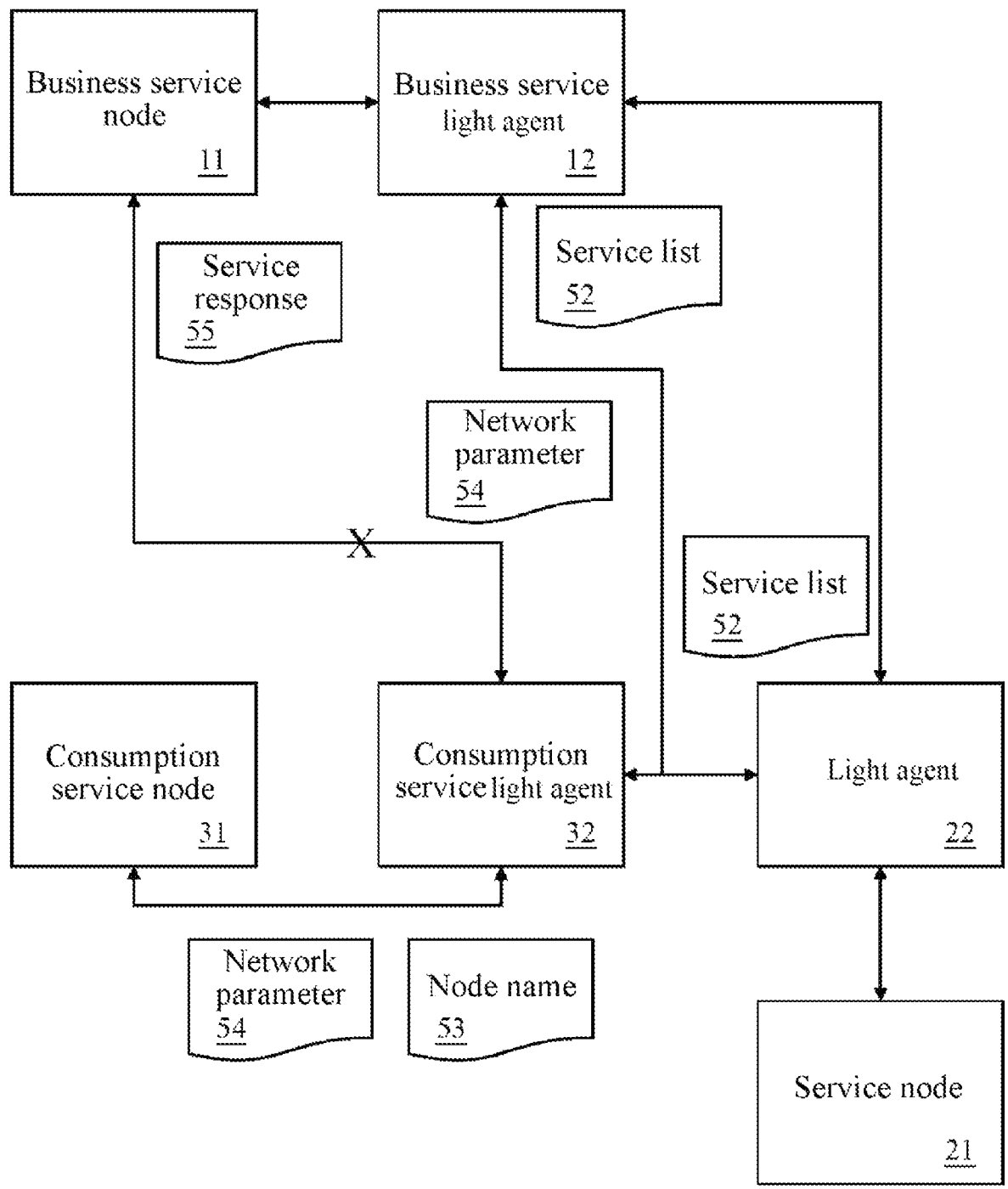

Referring to FIG. 3, FIG. 3 illustrates a data flow direction diagram of data transmission with network service decentralization of the present disclosure. If the consumption service LA 32 inquires the IP address of the corresponding business service node 11 from the service list 52 according to the node name 53 that is "ServiceA" of the business service node 11, the consumption service LA 32 transmits the network parameter 54 that is "status" to the corresponding business service node 11 according to the IP address of the business service node 11.

When the consumption service LA 32 does not receive the feedback service response 55 from the business service node 11 within the predetermined time, the consumption service LA 32 may remove the management information of the business service node 11 from the service list 52, and the consumption service LA 32 performs a synchronizing operation on the service list 52. That is, the consumption service LA 32 synchronizes the service list 52 to an LA 22, and the LA 22 is connected with a service node 21, so as to cause other LAs 22 to synchronously remove the management information of the business service node 11 from the service list 52, thereby preventing the LAs from selecting a service node that cannot be connected during selection.

Figure 4A:
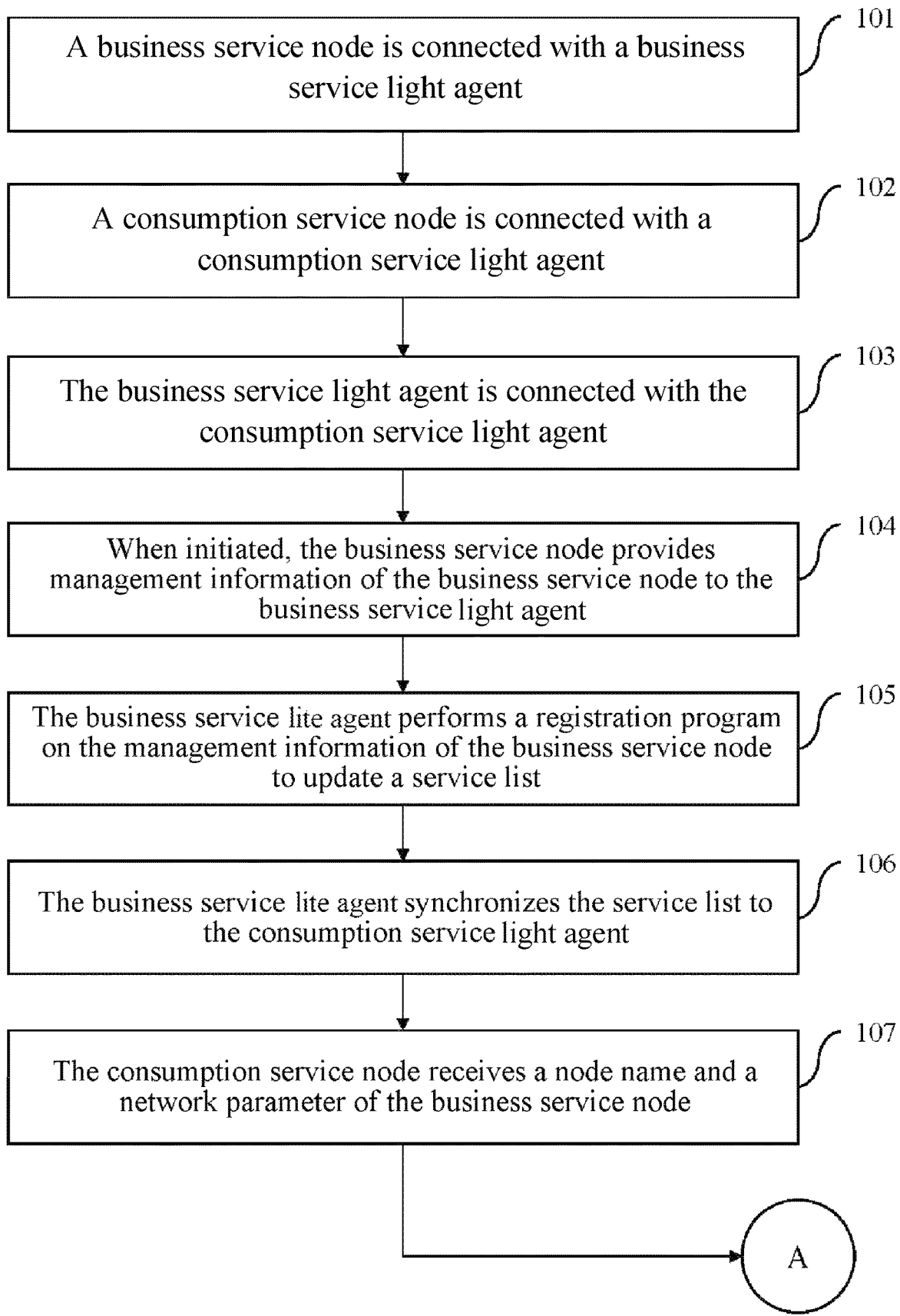
FIG. 4A and FIG. 4B illustrate flow diagrams of a data transmission method with network service decentralization according to the present disclosure.
Figure 4B:
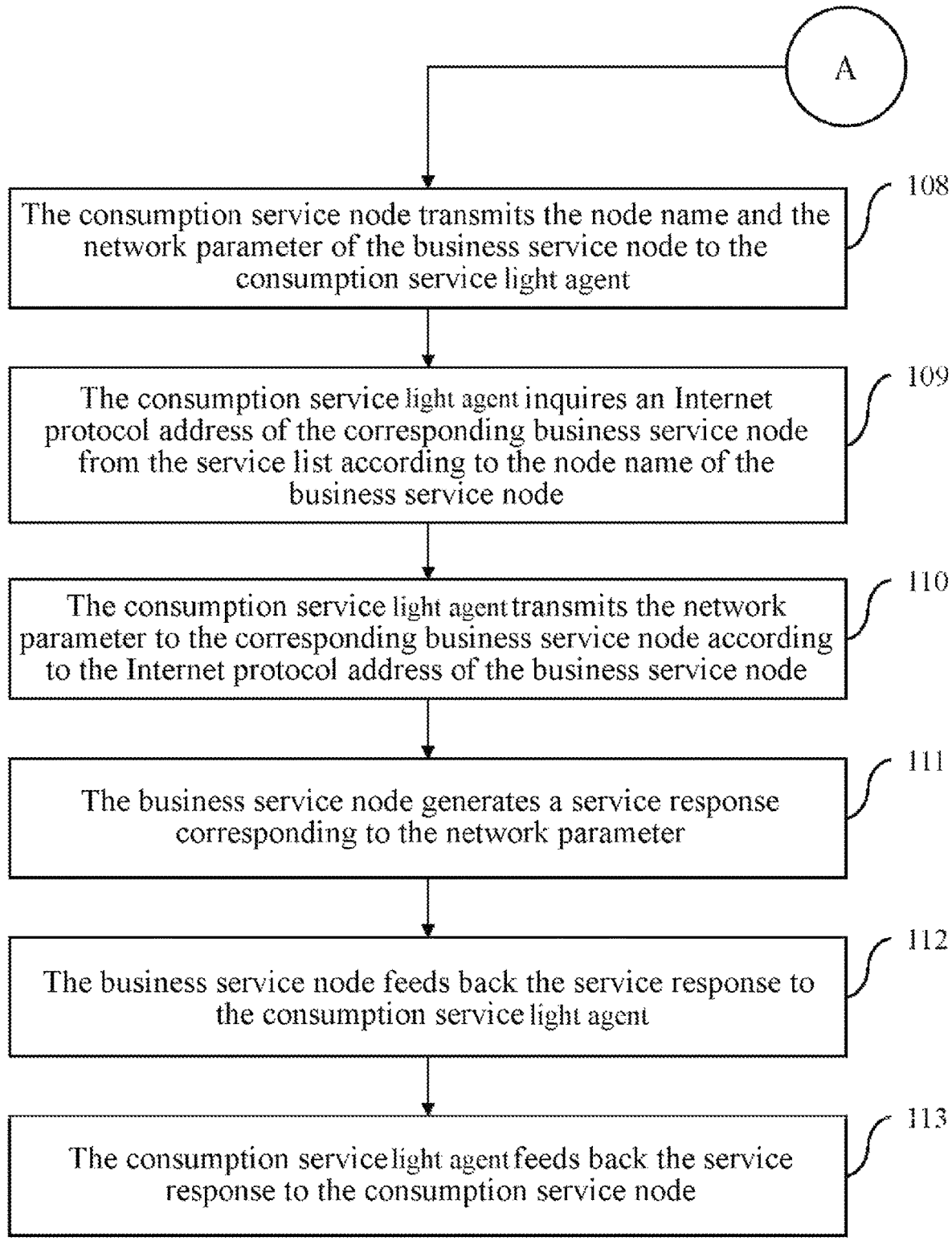

Then, an operation method of the present disclosure will be described below. Referring to FIGS. 4A-4B, FIGS. 4A-4B illustrate flow diagrams of a data transmission method with network service decentralization of the present disclosure.

Firstly, a business service node is connected with a business LA (Step 101). Then, a consumption service node is connected with a consumption service LA (Step 102). Then, the business service LA is connected with the consumption service LA (Step 103). Then, when initiated, the business service node provides management information of the business service node to the business service LA (Step 104). Then, the business service LA performs a registration program on the management information of the business service node to update a service list (Step 105). Then, the business service LA synchronizes the service list to the consumption service LA (Step 106). Then, the consumption service node receives a node name and a network parameter of the business service node (Step 107). Then, the consumption service node transmits the node name and the network parameter of the business service node to the consumption service LA (Step 108). Then, the consumption service LA inquires an IP address of the corresponding business service node from the service list according to the node name of the business service node (Step 109). Then, the consumption service LA transmits the network parameter to the corresponding business service node according to the IP address of the business service node (Step 110). Then, the business service node generates a service response corresponding to the network parameter (Step 111). Then, the business service node feeds back the service response to the consumption service LA (Step 112). Finally, the consumption service LA feeds back the service response to the consumption service node (Step 113).

In summary, the present disclosure differs from the prior art in that the business service node is connected with the business service LA, the consumption service node is connected with the consumption service LA, the business service LA is connected with the consumption service LA, registration and change of service nodes are realized through the LAs, the service nodes realize data transmission of requests and responses through the LAs, and when the connection to part of the LAs fails, the data transmission of the requests and the responses can still be realized through other LAs.

By means of this technical means, the problem in the prior art that existing network services still have centralized service nodes, and all the service nodes cannot work when central nodes are disabled can be solved, thereby achieving the technical effect of data transmission with network service decentralization.

Although the disclosed implementations of the present disclosure are described as above, the content described is not intended to directly limit the scope of patent protection of the present disclosure. Any person skilled in the art can make several changes to the forms and details of the implementations without departing from the spirit and scope disclosed by the present disclosure. The scope of patent protection of the present disclosure shall still be subject to those defined by the attached claims.

What is claimed is:

1. A data transmission system with network service decentralization, comprising:

a business service node, wherein when initiated, the business service node provides management information of the business service node, the business service node receives a network parameter and generates a service response corresponding to the network parameter, and the business service node feeds back the service response;

a business service lite agent, wherein the business service lite agent is connected with the business service node to receive the management information of the business service node from the business service node, the business service lite agent performs a registration program on the management information of the business service node to update a service list, and the business service lite agent performs a synchronizing operation on the service list;

a consumption service node, configured to transmit a node name and the network parameter of the business service node, wherein the consumption service node receives the feedback service response; and a consumption service lite agent, wherein the consumption service lite agent is connected with the business service lite agent, the consumption service lite agent synchronously obtains the service list from the business service lite agent, the consumption service lite agent is connected with the consumption service node to receive the node name and the network parameter of the business service node from the consumption service node, the consumption service lite agent inquires an Internet protocol address of the corresponding business service node from the service list according to the node name of the business service node, the consumption service lite agent transmits the network parameter to the corresponding business service node according to the Internet protocol address of the business service node, the consumption service lite agent receives the feedback service response from the business service node, and the consumption service lite agent transmits the feedback service response to the consumption service node.

2. The data transmission system with network service decentralization as in claim 1, wherein the business service lite agent builds HTTP persistent connection with the consumption service lite agent through a pre-built connection configuration or a user datagram protocol.

3. The data transmission system with network service decentralization as in claim 1, wherein the management information of the business service node comprises the node name of the business service node, the Internet protocol address of the business service node, a latest access frequency of the business service node, a node state of the business service node, and a response time of the business service node.

4. The data transmission system with network service decentralization as in claim 1, wherein the consumption service lite agent further comprises recording a response duration that the consumption service lite agent transmits the network parameter to the corresponding business service node and the business service node feeds back the service response to the consumption service lite agent.

5. The data transmission system with network service decentralization as in claim 4, wherein the consumption service lite agent updates the response duration of the business service node to a response time of the business service node in the service list, and performs a synchronizing operation on the updated service list.

6. A data transmission method with network service decentralization, comprising:
   connecting a business service node to a business service lite agent;
   connecting a consumption service node to a consumption service lite agent;
   connecting the business service lite agent to the consumption service lite agent;
   when initiated, providing, by the business service node, management information of the business service node to the business service lite agent;
   performing, by the business service lite agent, a registration program on the management information of the business service node to update a service list;
   synchronizing, by the business service lite agent, the service list to the consumption service lite agent;
   receiving, by the consumption service node, a node name and a network parameter of the business service node;
   transmitting, by the consumption service node, the node name and the network parameter of the business service node to the consumption service lite agent;
   inquiring, by the consumption service lite agent, an Internet protocol address of the corresponding business service node from the service list according to the node name of the business service node;
   transmitting, by the consumption service lite agent, the network parameter to the corresponding business service node according to the Internet protocol address of the business service node;
   generating, by the business service node, a service response corresponding to the network parameter;
   feeding back, by the business service node, the service response to the consumption service lite agent; and
   feeding back, by the consumption service lite agent, the service response to the consumption service node.

7. The data transmission method with network service decentralization as in claim 6, wherein the business service lite agent builds HTTP persistent connection with the consumption service lite agent through a pre-built connection configuration or a user datagram protocol.

8. The data transmission method with network service decentralization as in claim 6, wherein the management information of the business service node comprises the node name of the business service node, the Internet protocol address of the business service node, a latest access frequency of the business service node, a node state of the business service node, and a response time of the business service node.

9. The data transmission method with network service decentralization as in claim 6, wherein the consumption service lite agent further comprises recording a response duration that the consumption service lite agent transmits the network parameter to the corresponding business service node and the business service node feeds back the service response to the consumption service lite agent.

10. The data transmission method with network service decentralization as in claim 9, wherein the consumption service lite agent updates the response duration of the business service node to a response time of the business service node in the service list, and performs a synchronizing operation on the updated service list.

* * * * *